(No Model.)

A. D. WHITTON.
DEVICE FOR TRANSMITTING POWER.

No. 295,701. Patented Mar. 25, 1884.

WITNESSES:
L. Douville
W. F. Kircher

INVENTOR
Andrew D. Whitton,
BY John A. Wiedersheim
ATTORNEY.

UNITED STATES PATENT OFFICE.

ANDREW D. WHITTON, OF PHILADELPHIA, PA., ASSIGNOR OF TWO-THIRDS TO GEORGE RICE AND HANS P. HOUGEN, BOTH OF SAME PLACE.

DEVICE FOR TRANSMITTING POWER.

SPECIFICATION forming part of Letters Patent No. 295,701, dated March 25, 1884.

Application filed December 3, 1883. (No model.)

*To all whom it may concern:*

Be it known that I, ANDREW D. WHITTON, a subject of Great Britain, residing in the city and county of Philadelphia, State of Pennsylvania, have invented a new and useful Improvement in Machinery for Transmitting Power by Cable or Rope, &c., which improvement is fully set forth in the following specification and accompanying drawings, in which—

Figure 1:
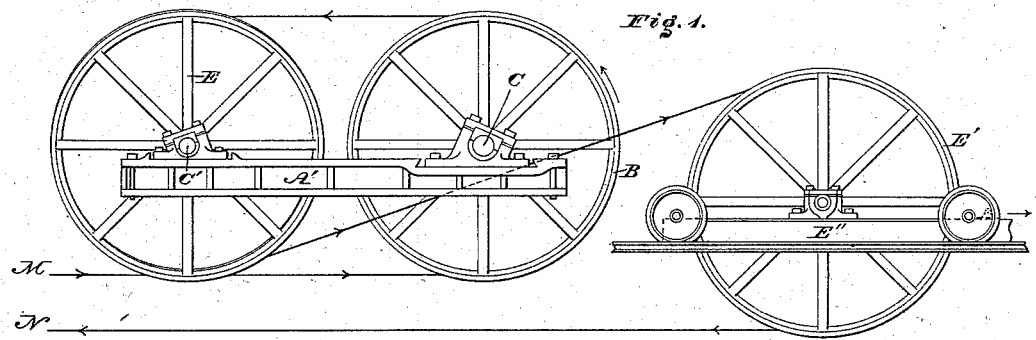
Figure 2:
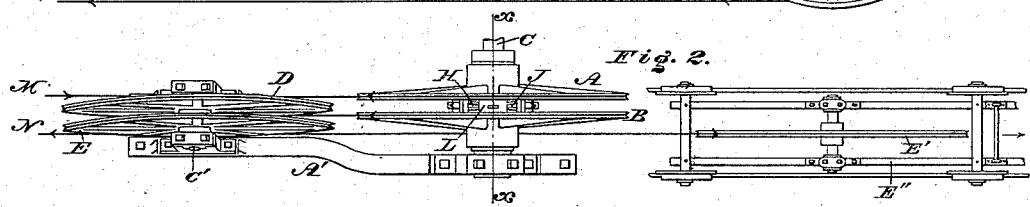
Figure 3:
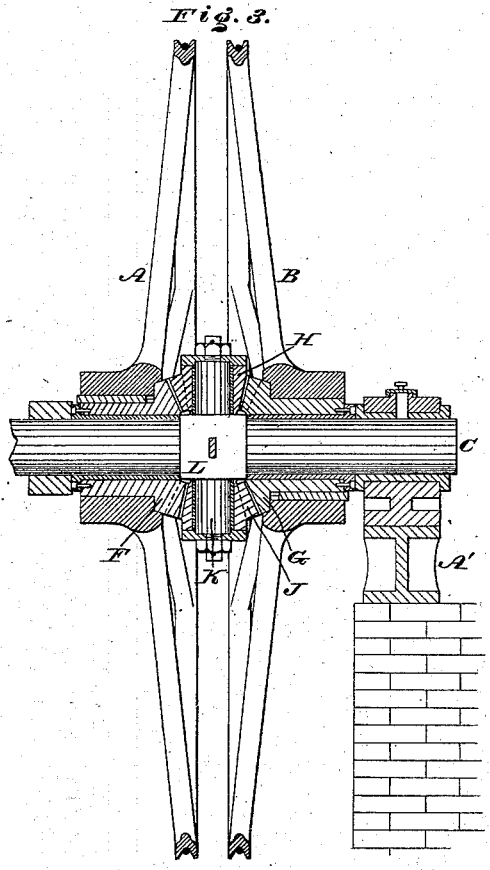

Figure 1 is a side elevation of a device for driving a cable for a cable railway embodying my invention. Fig. 2 is a top or plan view thereof. Fig. 3 is a section of the driving-pulley and connected parts enlarged.

Similar letters of reference indicate corresponding parts in the several figures.

This invention relates to certain improvements in the class of apparatus which has been proposed from time to time for driving machinery for cable railways, and its object is to prevent slip and consequent wear and tear of the pulleys and wire rope or cable. This object, broadly considered, is not new; but the insufficiency or inherent intricacy and unwieldiness, or a combination thereof, in apparatus heretofore employed are serious defects, which my invention is intended to remedy.

Referring to the drawings, A and B represent pulleys, which are loosely fitted on a shaft, C, which, properly mounted on a bed or frame, A', is driven by a suitable engine or motor.

D and E represent pulleys, which are fitted to a shaft, C', and revolve thereon independently of each other, said shaft being properly mounted on the bed or frame A'.

On the inner sides of the pulleys A B are bevel-wheels F G, which are secured to or cast with said pulleys, and mesh with the bevel-wheels H J, which are fitted loosely on a shaft, K, the location whereof is between the pulleys A B, the shaft A having a tubular block, L, which is forged or otherwise formed on or secured to it, and receives the shaft K, which is keyed to the block, the wheels H J being securely held on the shaft K by nuts or other proper fastenings, and the pulleys A B being securely held on the shaft C by collars or other devices. The cable, which is endless, enters from its work, say, at M, and then passes underneath around the pulley A, then over and around the pulley D, next under and around the pulley B, and then over and around the pulley E, to a pulley, E', on a tension-carriage, E", and so passes out to its work at N.

In the apparatus heretofore employed there are grooves on a drum, which is fitted to a shaft similar to the shaft C. Although the grooves may be turned very carefully to the same diameters, the different strains on the rope in the several grooves will eventually make them different, and the cable maintaining the speed of one groove must necessarily slip on the other, and so throw an extra strain on the rope and grooves.

By the employment of the wheels H J F G and the separate pulleys A B, I compensate the difference in the diameter of grooves by the difference in revolution. The mean of revolution of the pulleys A B will be that of the shaft C, which drives the two pulleys; hence a uniform velocity at the peripheries and the driving of the cable at a corresponding speed.

Having thus described my invention, what I claim as new, and desire to secure by Letters Patent, is—

1. The shaft C, in combination with the loose pulleys A B, the gear-wheels F G, connected with said pulleys, and gear-wheels H J, rotating with said shaft C and gearing with the wheels F G, substantially as and for the purpose set forth.

2. A shaft, in combination with pulleys loosely fitted thereon and carrying gear-wheels, and a shaft secured to the first-named shaft at a right angle thereto and supporting loosely-fitted gear-wheels, which gear with the first-named gear-wheels, substantially as and for the purpose set forth.

3. The bevel-wheels F G H J, the driving-pulleys A B, the independent pulleys D E, and the cable, combined and operating substantially as and for the purpose set forth.

ANDREW D. WHITTON.

Witnesses:
JOHN A. WIEDERSHEIM,
A. P. GRANT.